United States Patent [19]

Warner

[11] 3,821,724

[45] June 28, 1974

[54] TEMPORARY STORAGE APPARATUS

[75] Inventor: Philip C. Warner, Sharon, Mass.

[73] Assignee: GTE Sylvania Incorporated, Stamford, Conn.

[22] Filed: July 12, 1973

[21] Appl. No.: 378,717

[52] U.S. Cl. 340/173 R, 307/238

[51] Int. Cl. G11c 11/40

[58] Field of Search.. 340/173 R, 173 AM, 173 RC, 340/174 M; 307/238

[56] References Cited

UNITED STATES PATENTS 3,772,658 11/1973 Sarlo 340/173 R

*Primary Examiner*—Terrell W. Fears

*Attorney, Agent, or Firm*—David M. Keay; Elmer J. Nealon; Norman J. O'Malley

[57] ABSTRACT

Apparatus for temporarily storing a series of five 12-bit words which are received in series word, parallel bit format. The data bits are stored in an array of 60 latches arranged in 12 rows by 5 columns. The data input of each latch is connected to the output of the latch in the same row in the preceding column. The data bits are applied at the data input of the latches in the first column. The outputs of each stage of a 5-stage shift register are connected in reverse order from last to first to the clock inputs of all the latches of each column in succession from first to last. The 12 bits of a word are passed along the 12 rows of latches and become stored in the latches of the column of highest order in the succession not having data bits already stored therein by a change in the level at the clock inputs to the latches of that column caused by triggering of the stage of the shift register connected thereto. During the presence of each of the five words the next untriggered stage of the shift register in succession is triggered so that after receipt of five words the array of latches contain all the bits of the five 12-bit words of the series.

5 Claims, 3 Drawing Figures

TEMPORARY STORAGE APPARATUS

BACKGROUND OF THE INVENTION

This invention relates to apparatus for temporarily storing a plurality of data bits. More particularly, it is concerned with apparatus for temporarily storing a plurality of N × M data bits which are received in M bits of groups in series, each group of the series consisting of N bits in parallel.

In certain data processing applications it is necessary to provide equipment for interfacing between an apparatus such as a computer which presents a word, or a group of data bits in parallel, on a data bus and peripheral equipment which requires an input of several words applied in parallel. Several words are received one at a time in series word, parallel bit format and temporarily stored so that a set of data may be applied to the peripheral device in parallel word, parallel bit format.

One form of interface apparatus for handling data in this manner employs a plurality of N × M registers where N is the number of bits in a word and M is the number of words in a series. The data bits are applied to the registers through a plurality of N × M gates which are connected to the registers and to the N terminals of the data bus. N gates are enabled at a time in order to store the N data bits of one word in the registers. A different group of N gates is enabled for each of M periods to store a set of M words in the registers. In addition to the registers and gates, a shift register and other logic circuitry are required to properly strobe the gates which direct the data bits of each word to the proper registers for storage.

SUMMARY OF THE INVENTION

Apparatus for temporarily storing a plurality of data bits in accordance with the present invention reduces the number of logic components required to interface between equipment presenting N bits in parallel and equipment requiring an input of N × M bits in parallel. The apparatus in accordance with the invention comprises a group of N input terminals which are adapted to receive N bits of input data in parallel. The apparatus also includes a plurality of N × M latching means which are arranged in an electrical matrix of N rows by M columns. Each of the latching means has an input connection, an output connection, and a control connection. Each latching means transfers the data bit present at its input connection to its output connection while a first control signal is present at its control connection. Each latching means stores the data bit present at its input connection when the signal at its control connection changes from the first control signal to a second control signal, and holds the data bit in storage until the signal at its control connection changes from the second control signal back to the first control signal. The input connection of each latching means is connected to the output connection of the latching means in the preceding column of the same row and the input connection of each latching means in the first column is connected to the corresponding input terminal.

The apparatus also includes a control means which has a clock connection, a reset connection, and M output connections which are arranged in succession. Each output connection of the control means is connected to all the control connections of the latching means of the corresponding column. The control means produces the first control signal at all of its output connections in response to a reset signal being received at its reset connection. The control means causes the signal at each output connection of the control means in reverse succession from the last to the first to change from the first control signal to the second control signal in response to a succession of clock pulses at the clock connection so that after M clock pulses second control signals are produced at all of the output connections.

Thus, subsequent to a reset signal which is applied to the reset connection causing the control means to produce the first control signal at all of its output connections and therefore to all the control connections of the plurality of latching means, when a group of N bits in parallel is being applied to said N input terminals and a clock pulse is applied to the clock connection of said control means, bits of input data of the group are passed along the N rows of latching means and stored in the latching means of the column of highest order in the succession not having data bits already stored therein. After a series of M groups of N bits are applied to the input terminals and M clock pulses have been applied to the clock connection at the appropriate times, N × M bits are stored in the plurality of N × M latching means.

BRIEF DESCRIPTION OF THE DRAWINGS

Additional objects, features, and advantages of temporary storage apparatus in accordance with the present invention will be apparent from the following detailed discussion together with the accompanying drawings wherein.

DETAILED DESCRIPTION OF THE INVENTION

Figure 1:
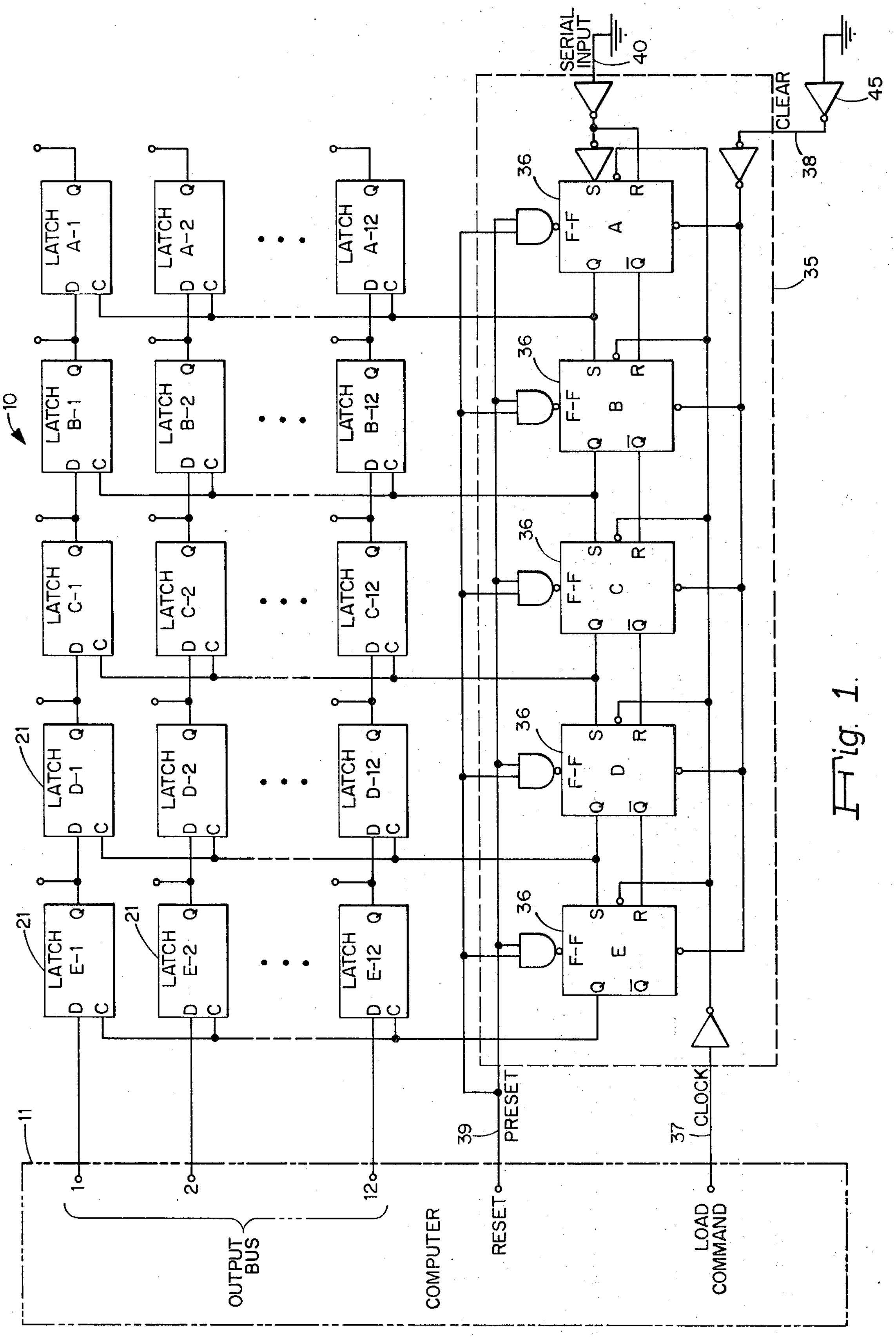
FIG. 1 is a block diagram of temporary storage apparatus in accordance with the present invention.

The apparatus as illustrated in the block diagram of FIG. 1 includes a temporary storage apparatus 10 in accordance with the present invention for interfacing between equipment such as a computer 11, as indicated in phantom, and peripheral equipment, not shown. The computer 11 has an output bus of 12 terminals for presenting all the bits of a 12-bit word in parallel. The storage apparatus 10 receives a series of five 12-bit words from the computer and holds the five words in temporary storage so as to permit all the data bits for the five words to be read out in parallel. The computer 11 produces a load command clock pulse on line 37 during the period each word is present at the output bus, and produces a reset pulse on line 39 before each set of five words.

Figure 2:
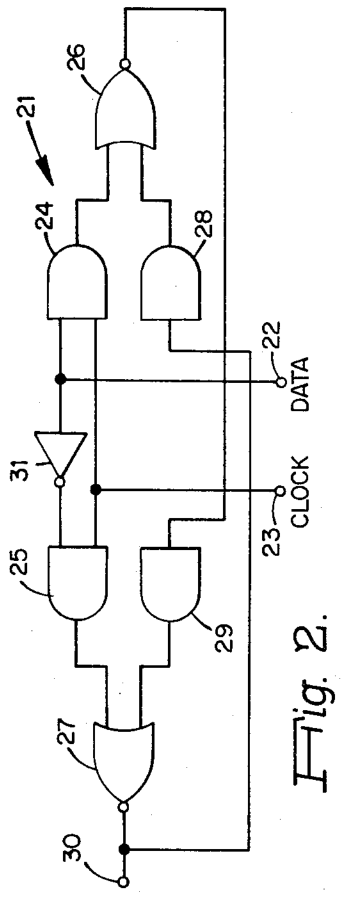
FIG. 2 is a detailed block diagram of a latch employed in the apparatus of FIG. 1.

The temporary storage arrangement 10 includes an array of 60 latches or storage registers 21 arranged in an electrical matrix of 12 rows by 5 columns. In FIG. 1 the rows of latches are labeled 1 through 12 and the columns are labeled E through A. The 60 latches are identical. Each latch has a data input terminal D, a clock or control input terminal C, and an output terminal Q. An individual latch 21 is illustrated in detail in the logic diagram of FIG. 2. As shown in FIG. 2 the data input terminal 22 and clock input terminal 23 are connected to the inputs of a 2-input AND gate 24. The clock input terminal 23 is connected directly to one input of a 2-input AND gate 25 and the data input terminal 22 is connected to the other input terminal of the AND gate 25 through an inverter 31. The latch includes an inverting OR gate 26 having one input connected to the output of the AND gate 24, and an inverting OR gate 27 having one input connected to the output of the AND gate 25. The output of the inverting OR gate 27 is connected through a single input gate 28 to the other input of the inverting OR gate 26, and the output of the inverting OR gate 26 is connected through another single input gate 29 to the other input of the other inverting OR gate 27. The output terminal Q 30 is connected to the output of the inverting OR gate 27. If desired, a $\bar{Q}$ output may be taken at the output of the inverting OR gate 26 although such an output is not required in the present apparatus.

Each latch 21 has two operating states. Whenever the input at the clock terminal 23 is high the latch is enabled so that a high level at the data input terminal 22 causes the latch to operate in its first state and produce a high level at the output terminal Q 30, and a low level at the data input terminal 22 causes the latch to operate in its second state and produce a low level at the output terminal Q 30. The latch is inhibited from changing states while the input at the clock terminal 23 is low. Thus, the state of the latch when the clock input changes from high to low is retained until the input at the clock terminal again becomes high. That is, whenever the input at the clock terminal 23 is high, the data present at the input terminal 22, whether high or low, is produced at the output terminal Q 30. When the level at the clock terminal 23 changes from high to low, the level at the output terminal Q 30 remains the same as it was at the time of the transition regardless of subsequent levels at the data input terminal 22.

As shown in FIG. 1 the data input D of each latch 21 is connected to the output terminal Q of the latch of the preceding column in the same row. The latches of the first column are connected to corresponding terminals of the output bus of the computer 11. The output terminals Q of the latches 21 are indicated as being available for connecting to 60 input terminals of suitable utilization equipment which receives the data from the latches in parallel after five 12-bit words have been received and stored.

The apparatus also includes a shift register 35 which controls the storage of data within the latches 21 of the array. The shift register is a 5-bit shift register having five RS master-slave bistable flip-flop stages 36 arranged in succession from A to E. Each flip-flop stage has a set input, a reset input, a preset input, a clear connection, a clock connection, a Q output and a $\bar{Q}$ output. The clock connections are connected in common to line 37, and the clear connections are connected to a line 38. Each stage has two preset connections through a gate to its preset input. In the apparatus under discussion all the preset connections are connected in common to a single line 39 to provide a single preset for presetting all stages simultaneously. A serial input 40 is connected to the first flip-flop stage A in the succession. Outputs are taken from the Q outputs of each of the flip-flop stages and each output is connected to all the clock inputs of a different column of latches. The output connections of the flip-flop stages A through E are connected in reverse order to the columns of latches labeled E through A. That is, the output Q of the first shift register stage A is connected to the clock inputs C of the latches of the last column A. The outputs Q of the other stages are connected to similarly designated columns of latches with the output Q of the last stage E of the shift register connected to the latches of the first column E.

The flip-flop stages of the shift register 35 may all be set to the operating state which produces a low level at the output terminals Q by a low level pulse at the clear connection 38. During operation and transfer of data through the shift register the clear connection must be high. In the apparatus under discussion a high level is applied continuously to line 38 as indicated by the inverter 45 having its input connected to ground. A high level pulse at the common preset connection 39, which is connected to the reset terminal of the computer 11, sets all the flip-flop stages to the operating state which produces a high level at the output terminals Q. The shift register acts to transfer the contents, or operating state, of each stage to the next stage in succession from A through E on the positive-going edge of each clock pulse on the line 37, which is connected to the load command terminal of the computer 11. As shown in FIG. 1 the serial input 40 of the shift register 35 is connected to ground so as to continuously supply a low level to the input of the first shift register stage A.

Figure 3:
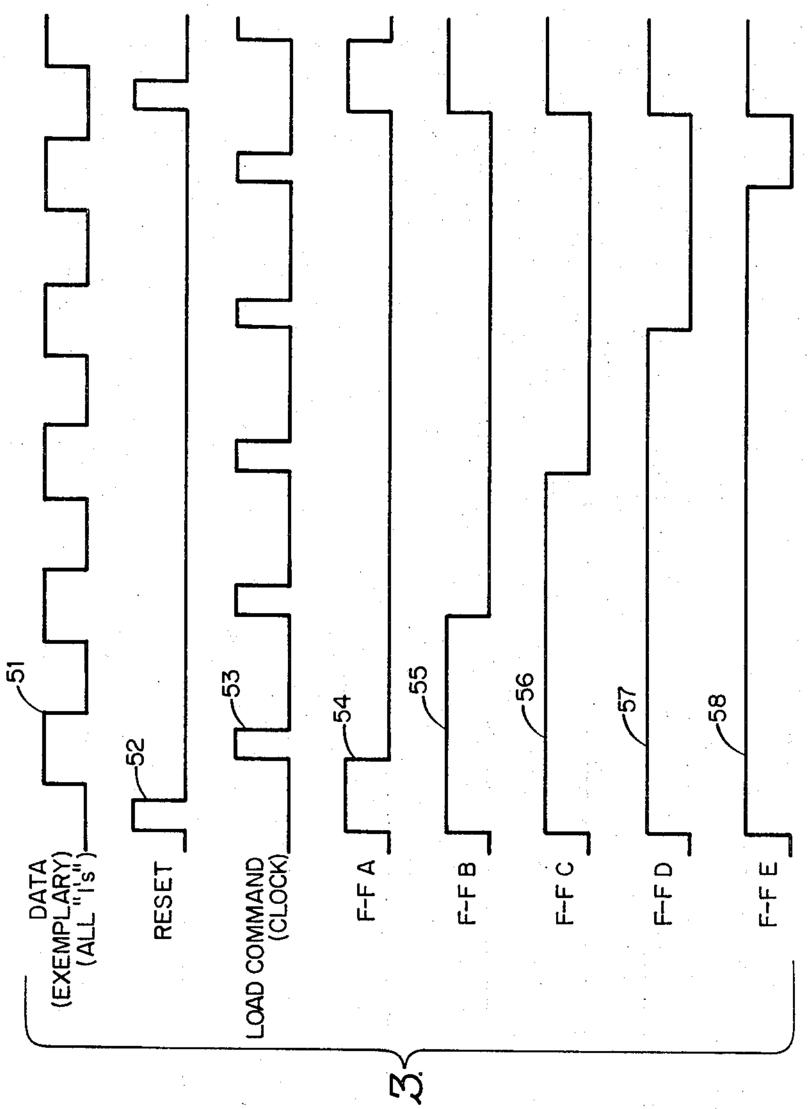
FIG. 3 is a set of voltage waveforms occurring in the apparatus of FIG. 1 which are useful in explaining the operation of the apparatus of FIG. 1.

Operation of the apparatus of FIG. 1 to store a set of five 12-bit words in series word, parallel bit format as produced at the output bus of the computer 11 may best be understood by reference to the waveforms of FIG. 3. The first waveform 51 illustrates an exemplary series of 5 bits appearing at one of the twelve output bus terminals of the computer 11. For illustrative purposes the bits are all shown as positive pulses designated as logic "1." A logic "0" would be indicated by the lack of a positive pulse. The second waveform 52 is the signal produced by the computer 11 at the reset terminal before each set of five words is produced by the computer 11. The third waveform 53 illustrates the clock pulses which are produced at the load command terminal of the computer 11 on line 37. A clock pulse occurs within the period each word is produced at the output bus. Waveforms 54 through 58 illustrate the voltages at the Q outputs of the five flip-flop stages A through E, respectively, of the shift register 35. These signals are applied to the clock input connections C of the respective columns of latches 21.

At the start of an operating cycle a positive-going reset pulse 52 from the computer 11 on the line 39 sets all of the flip-flop stages 36 of the shift register 35 so as to produce a high level at their Q outputs as shown in waveforms 54 through 58. All of the latches 21 of the array are therefore enabled. The 12 bits of the first word of the series then appears at the 12 terminals of the output bus of the computer 11 as illustrated by the first pulse of waveform 51. Since all the latches in the array are enabled, all the latches of each row are triggered to produce the voltage levels appearing at the corresponding output bus terminal. That is, the bit at each output bus terminal is propagated throughout the latches of its corresponding row. During the period the bits of the first word are present at the output bus, a first clock pulse 53 is produced at the load command terminal of the computer 11 and applied to the shift register 35 on line 37. As explained previously, on the positive-going edge of the clock pulse 53 the condition of each of the stages of the shift register 35, in effect, is shifted to the following stage in succession, and the first stage A is switched in accordance with the signal at the serial input 40. Since prior to the clock pulse the output of all the stages is high and the serial input 40 is at ground, stage A changes state and the other stages B through E remain the same. Thus, the output of the first stage A becomes low as shown in waveform 54. The inputs to all the clock input terminals of the latches in column A therefore change from high to low and the data bits of the first word become stored in the latches of column A.

On the second word, the 12 bits of data on the output bus of the computer 11 pass through the first four columns E through B of latches setting all the latches in each row of these columns to the appropriate state. The latches in column A are inhibited by virtue of the low level at their clock input and continue to store the bits of the first word. On the forward edge of the second clock pulse 53, the states of the flip-flop stages in the shift register 35 are, in effect, shifted to the left and the second stage B is triggered so as to produce a low level at its Q output as shown in waveform 55. The output of the first stage A remains low because of the low level at the serial input 40. When the level at the clock inputs C of the latches of column B changes from high to low, the data bits of the second word become stored therein.

The apparatus continues to operate in the foregoing manner to store the bits of the third word in the latches of column C, the bits of the fourth word in the latches of column D, and the bits of the fifth word in the latches of column E. After the fifth clock pulse 53 the five 12-bit words of the series are stored in the array of 60 latches and the 60 data bits are available at the output terminals Q of the 60 latches of the array. The 60 bits of data may then be read out in parallel and utilized by peripheral equipment (not shown). After the data has been read out of the array of latches, the next cycle is started with a reset pulse 52 on line 39 which resets all of the flip-flop stages of the shift register 35 to produce the high level and thus prepare the latches of the array for receiving and storing the next set of five 12-bit words.

Temporary storage apparatus in accordance with the present invention may be expanded to handle words of more than 12 bits and more than five words in a series. The shift register 35 must also be expanded to contain the same number of flip-flop stages as the number of columns of latches, or number of words in each series.

The temporary storage apparatus as shown requires a smaller number of logic components than systems heretofore employed in interfacing arrangements. The latches under control of the shift register stages provide the functions of both gating and storage. Thus, the need for gates in addition to storage registers is eliminated.

The apparatus as illustrated was employed as an interface apparatus with a Digital Equipment Corporation PDP–8 computer having a 12-bit output bus. The latches were SN7475 quad latches. That is, four latches were combined in a single circuit package requiring a total of 15 packages to provide the 60 latches of the array. The 5-bit shift register 35 as indicated within the dashed lines of FIG. 1 was an SN7496 5-bit shift register. The circuit as shown is amenable to further integration in that all of the latches and the shift register may be placed on a single chip of silicon in a single package in an LSI arrangement if desired.

While there has been shown and described what is considered a preferred embodiment of the present invention, it will be obvious to those skilled in the art that various changes and modifications may be made therein without departing from the invention as defined by the appended claims.

What is claimed is:

1. Apparatus for temporarily storing a plurality of N × M bits which are received in M groups of bits in series, each group of the series consisting of N bits in parallel, said apparatus comprising a gorup of N input terminals adapted to receive N bits of input data in parallel;

a plurality of N × M latching means arranged in an electrical matrix of N rows by M columns;

each latching means having an input connection, an output connection, and a control connection, each latching means being operable to transfer the bit at its input connection to its output connection while a first control signal is present at its control connection, and being operable to store the bit present at its input connection when the signal at the control connection changes from the first control signal to a second control signal until the signal at the control connection changes from the second control signal to the first control signal;

the input connection of each latching means being connected to the output connection of the latching means in the preceding column of the same row, the input connection of each latching means in the first column being connected to the corresponding input terminal; and control means having a clock connection, a reset connection, and M output connections arranged in succession, each output connection of the control means being connected to all the control connections of the latching means of the corresponding column, said control means being operable to produce said first control signal at all of said output connections in response to a reset signal at said reset connection and being operable to cause the signal at each output connection in reverse succession from last to first to change from the first control signal to the second control signal in response to clock pulses at the clock connection so that after M clock pulses second control signals are produced at all the output connections;

whereby, subsequent to a reset signal applied to said reset connection, when a group of N bits in parallel is applied to said N input terminals and a clock pulse is applied to the clock connection of said control means during the time the group of bits is being applied to the input terminals, bits of input data are passed along the N rows of latching means and stored in the latching means of the column of highest order in the succession not having bits of data already stored therein; and after a series of M groups of N bits are applied to the input terminals and M clock pulses have been applied to the clock connection, N × M bits are stored in the N × M latching means.

2. Apparatus for temporarily storing a plurality of N × M bits in accordance with claim 1 wherein said control means includes a shift register means having M stages arranged in succession, each stage having an input connection and an output connection connected to the input connection of the next stage in the succession, the output connection of each stage being connected in reverse order from last to first to the control connections of the latching means of each column of latching means in succession from first to last, each stage having a first operating state during which it produces said first control signal at its output connection and a second operating state during which it produces said second control signal at its output connection, each stage being operable to be triggered from the first operating state to the second operating state in response to a clock pulse at the clock connection while a second control signal is present at its input connection, all of said stages being operable to be triggered to the first operating state in response to a reset signal at said reset connection;

means for applying a second control signal to the input connection of the first stage of the succession;

whereby, subsequent to a reset signal applied to said reset connection setting all the stages to the first operating state, a series of M clock pulses causes each stage in succession to be triggered from the first operating state to the second operating state thereby changing the signals at the output connections from the first control signal to the second control signal in succession.

3. Apparatus for temporarily storing a plurality of N × M bits in accordance with claim 2 wherein each of said latching means has a first operating state during which it produces a first signal at its output connection and a second operating state during which it produces a second signal at its output connection;

each of said latching means being enabled while a first control signal is present at its control connection to operate in the first operating state during a first signal at its input connection and to operate in the second operating state during a second signal at its input connection; and each of said latching means being inhibited from changing operating states while a second control signal is present at its control connection.

4. Apparatus for storing a plurality of N × M bits in accordance with claim 3 wherein each stage of said shift register means includes a bistable flip-flop;

said first control signal is a first voltage level; and said second control signal is a second voltage level.

5. Apparatus for storing a plurality of N × M bits in accordance with claim 4 wherein said first signal produced by each of said latching means is a first voltage level;

said second signal produced by each of said latching means is a second voltage level;

a first voltage level applied at the input connection of a latching means of the first column designates a bit of value "1;" and a second voltage level applied at the input connection of a latching means of the first column designates a bit of value "0."

* * * * *